May 9, 1961     S. A. GREENSPON     2,983,247
TEMPERATURE TELL-TALE
Filed March 31, 1960
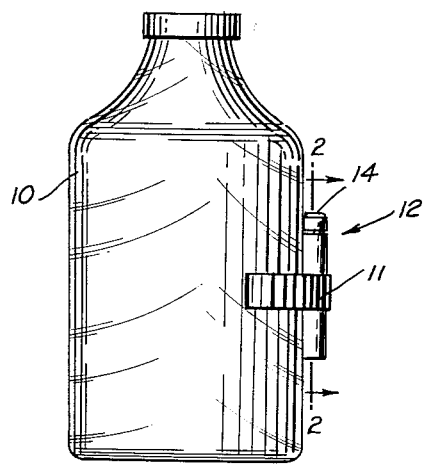
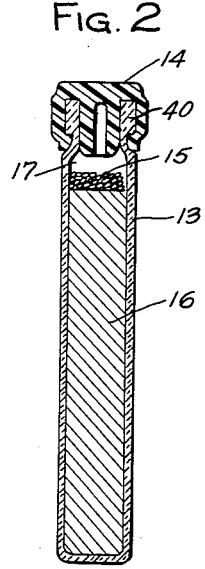
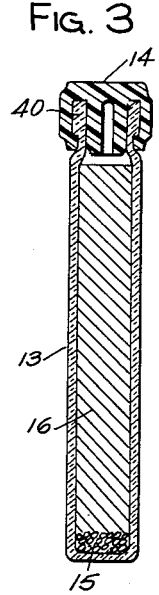
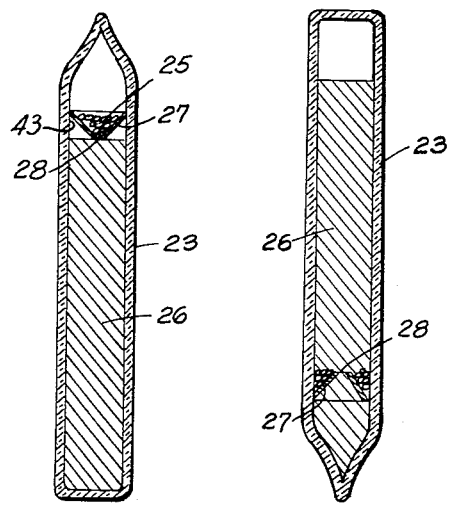
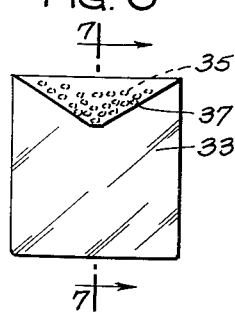
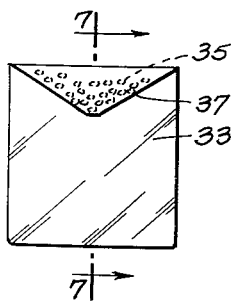
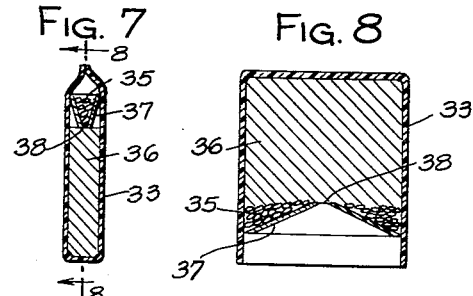
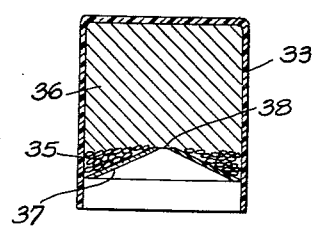
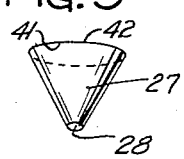
INVENTOR.
SEYMOUR AARON GREENSPON
BY
Kegan, Bellamy & Kegan
ATTORNEYS

United States Patent Office
2,983,247
Patented May 9, 1961

2,983,247

TEMPERATURE TELL-TALE

Seymour Aaron Greenspon, Skokie, Ill., assignor to Rand D Corp., Chicago, Ill., a corporation of Illinois Filed Mar. 31, 1960, Ser. No. 19,091

2 Claims. (Cl. 116—106)

The present invention relates generally to temperature tell-tale devices and more particularly to devices of this type which tell whether the temperature of an associated article has at some time reached a preselected level.

Basically, the subject tell-tale comprises a container in isothermal association with the article, a weight within the container, and means for supporting the weight in an upper position when the temperature is below the preselected level and which yields and permits the weight to fall to a lower position when the temperature rises to the preselected level.

The subject tell-tale is intended to be used in association with normally refrigerated articles which are adversely affected or undergo undesirable changes if their temperatures exceed a certain level. For example, stored blood becomes unfit for transfusion purposes if its temperature has at some time exceeded a certain level, and some foods lose their flavor if their temperatures change from below a certain level to above that level and then below it again.

The medium which supports the weight in the subject tell-tale is a substance which is impermeable to said weight when the temperature of the substance is below the desired preselected level and which becomes permeable to the weight when the temperature rises to the preselected level. To prepare the tell-tale for use the weight and the substance are placed in the container which is then closed and inverted causing the weight to fall to a position adjacent what is normally the top of the container. The container and its contents are then refrigerated at temperatures below the preselected level so as to freeze the substance and then the container is reinverted whereby the weight is supported in a position in the upper portion of the container by the frozen impermeable substance. The tell-tale is then placed in isothermal association with an article.

Since the weight need not be frozen in its upper position until the tell-tale is needed for use, the tell-tale need not be inverted or refrigerated until shortly before it is to be used. Thus, is may be transported and stored prior to use in any position and without regard to temperature.

Furthermore, after it has indicated that the preselected temperature has been exceeded, the fallen weight can be returned to its upper position merely by inverting and refrigerating the tell-tale. Thus the subject tell-tale can be reused over and over.

Therefore, it is a primary object of the present invention to provide a tell-tale which indicates, by the movement of a weight from an upper to a lower position, whether the temperature of an article has exceeded a preselected level.

Another object of the present invention is the provision of a tell-tale of the type described and which may be transported and stored prior to use in any position and without refrigeration.

A further object of the present invention is the provision of a tell-tale of the type described and which may be reused after each indication.

Still another object of the present invention is the provision of a tell-tale of the type described and which is simple in construction and economical as to cost.

A further object of the present invention is the provision of a tel-tale including means for indicating whether the tell-tale has been inverted to return the fallen weight to its upper position in an attempt to conceal the fact that the temperature of the associated article has exceeded the preselected level.

Other advantages are inherent in the structure disclosed and claimed as will become apparent to those skilled in the art from the following detailed description in conjunction with the accompanying drawings wherein:

Fig. 1 is an elevational view showing a tell-tale constructed in accordance with the present invention and isothermally associated with a blood-containing bottle by tapping the tell-tale to the side of the bottle.

Fig. 2 is an enlarged vertical sectional view of the tell-tale taken along line 2—2 in Fig. 1 showing the components of the tell-tale as they appear when the temperature is below the preselected level;

Fig. 3 is a vertical sectional view similar to Fig. 2 and showing the components as they appear after the preselected temperature level has been exceeded;

Fig. 4 is an enlarged vertical sectional view similar to Fig 2 of another embodiment of the present invention, and shows the components as they appear when the temperature is below the preselected level;

Fig. 5 is a sectional view similar to Fig. 4 and shows the components as they appear when the preselected temperature level has been exceeded and the tell-tale has been inverted;

Fig. 6 is a front view of another embodiment of a tell-tale constructed in accordance with the present invention;

Fig. 7 is a vertical sectional view taken along line 7—7 in Fig. 6 showing the components of the tell-tale as they appear when the temperature is below the preselected level;

Fig. 8 is a vertical sectional view taken along line 8—8 in Fig. 7 and shows the components as they appear when the preselected temperature level has been exceeded and the tell-tale is inverted; and Fig. 9 is an enlarged perspective view of a funnel used in the embodiment of Figs. 4 and 5.

Referring to Fig. 1, there is generally indicated a temperature tell-tale 12 for indicating whether the temperature of an isothermally associated article has at some time exceeded a preselected level. For illustration purposes the article is shown to be a blood-containing bottle 10 and the tell-tale 12 is shown held in isothermal association with bottle 10 by tape 11 attaching the tell-tale to the bottle's side.

An embodiment of tell-tale 12 is shown in detail in Fig. 2 and comprises a container or elongated vial 13 having an upper end 40 which is closed by a stopper 14. Within container 13 are a plurality of weights or lead-shot particles 15 and a weight supporting medium or substance 16 which is impermeable to the weights 15 when the temperature of the substance is below the preselected level (in this case the temperature which renders blood unfit for use) and which becomes permeable to shot particles 15 when the temperature rises to the preselected level.

When the tell-tale is to be used the container 13 is inverted at a temperature at which the substance is permeable thereby permitting the particles 15 to fall to positions adjacent stopper 14. The inverted tell-tale is then refrigerated at a temperature which freezes the substance and renders it impermeable so that upon reinversion of the container to a top-side-up position the particles 15 are supported by the impermeable substance 16 in positions adjacent stopper 14. The tell-tale is then placed in isothermal association with a refrigerated article such as blood-containing bottle 12.

If and when the temperature of bottle 10 and associated tell-tale 12 rises to the preselected or unsafe level (e.g. following removal of bottle 10 from the refrigerator), substance 16 becomes permeable to weights 15 which fall through the substance to positions at the bottom of container 13 (Fig. 3) thereby indicating that the preselected temperature level has been exceeded and that the blood within bottle 10 is unfit for use. This indication may be given by visual signal in which case the container walls should be constructed of material through which the weights 15 can be seen when in their lower positions.

The substance 16 for a tell-tale to indicate the fitness of blood is composed of methoxy polyethylene glycol (molecular weight 350) and polyethylene glycol (molecular 600), in a weight proportion of 3.5 of the former to 1.5 of the latter. When refrigerated blood is exposed to room temperature it generally takes approximately 15 minutes for the temperature of the blood to rise to a level at which the blood is unfit. When the above described substance is removed from a refrigerator and exposed to room temperature it generally takes only eight minutes before the substance becomes partially permeable and only twelve minutes or so before complete permeability is attained. Thus, by the time the blood becomes unfit for use the substance will have been completely permeable for a few minutes to permit the weights 15 to fall through the permeable substance to the bottom of the container.

For other articles which become unsafe at other temperatures, the composition of the substance can be changed so that it becomes permeable at higher or lower temperatures depending upon the materials and proportions thereof used to concoct the substance. For example, the temperature level at which the substance becomes permeable can be raised by increasing the amount of polyethylene glycol having a molecular weight of 600 or by substituting a polyethylene glycol having a still higher molecular weight, and vice versa.

Since the weights 15 need not be frozen into their upper positions until shortly before the tell-tale is to be used, it is possible to transport or store the tell-tales in any position and without regard to temperature. Furthermore, even after the weights have fallen to their lower positions in response to a temperature rise in the tell-tale and its associated article to the preselected level, the tell-tale can be conditioned for reuse merely by disassociating it from the article, inverting it, and then refrigerating it in the inverted position until the weights 15 are frozen in positions adjacent what is normally the upper portion of container 13.

It may happen that an unscrupulous person, having carelessly allowed the temperature of the article 10 to exceed the preselected level, will attempt to cover up his carelessness by returning article 10 to the refrigerator in an inverted disposition so that the attached tell-tale 12 is also inverted, thereby causing the shot particles 15 to return from their positions at the bottom of container 13 to positions adjacent stopper 14, where they will be maintained when the refrigerated substance refreezes. After the substance has refrozen, if the article 10 and container 13 are then turned top-side-up the shot particles will be in a supported position adjacent stopper 14 thereby erroneously indicating that the preselected temperature has not been exceeded.

Tampering of this sort can be prevented by the following means. Tell-tale 12 may be provided with an air space 17 located in the top of container 13 (Fig. 2). Thus, when container 13 is returned to the refrigerator in an inverted position and the substance 16 refrozen, although the shot particles will be supported in a position adjacent stopper 14, the air space 17 will be filled up by the refrozen substance, thereby indicating that there has been tampering with the device. To load tell-tale 12 so that it is provided with an air space requires leaving such a space when the substance is put into the container initially and freezing the substance in the container before the shot particles are placed therein so that the shot particles will be supported on top of the frozen impermeable substance.

Figs. 4 and 5 show another embodiment of the present invention also containing means for indicating that there has been tampering with the tell-tale after the preselected temperature level has been exceeded. This embodiment, like the previous embodiment, comprises an elongated vial or container 23 containing a substance 26. Located near the top of container 23 is a funnel 27 having an inverted frusto-conical shape (Fig. 9). A plurality of lead-shot particles or weights 25 are supported within the funnel 27 by substance 26 while the latter is impermeable. The lower opening 28 of funnel 27 is large enough to permit a shot particle to pass therethrough. The periphery 41 of the funnel around the upper opening 42 thereof is in engagement with the interior surface 43 of the walls of container 23.

As the temperature rises, substance 26 becomes permeable to the lead-shot particles which can thus no longer be supported in their position within funnel 27 and fall downwardly through funnel opening 28 and permeable substance 26 to the bottom of the container 23. If container 23 is subsequently inverted, in an attempt to tamper with the tell-tale signal, the lead-shot particles will fall back to positions along the outer surface of funnel 27 as shown in Fig. 5. Due to the smallness of the opening 28 in the funnel it is statistically unlikely that a descending shot particle will re-enter funnel 27. Thus, if container 23 is returned to the refrigerator in its inverted position the substance 26 will refreeze and maintain the shot particles in the position shown in Fig. 5, thereby indicating tampering.

Referring to Figs. 6 and 7, there is shown a tell-tale intended for use with frozen foods. This embodiment of the present invention comprises a bag 33 containing a substance 36. Bag 33 is intended to be attached to the vertical side walls of a frozen food-containing package. Within the interior of bag 33, and near the top thereof, is located a funnel or hopper 37 shaped substantially like an inverted truncated pyramid. A plurality of lead-shot particles 35 are supported within hopper 37 by substance 36 while the latter is impermeable. When the substance becomes permeable in response to a temperature rise, the shot particles are no longer so supported and fall through the lower opening 38 in hopper 37 downwardly through permeable substance 36 to the bottom of container 33.

Tampering with this embodiment to eliminate the warning signal is of no use because of the inclusion of funnel 37. The top edges of funnel 37 engage the inner wall surfaces of bag 33 thereby preventing fallen shot particles from returning into the hopper around its top edges when the bag 33 is inverted. Furthermore, the lower opening 38 in hopper 37 is of a size rendering it statistically unlikely that shot particles moving from the bottom of the bag 33 towards the hopper will pass through opening 38. Upon inversion of bag 33 the fallen shot particles will move to positions along the outer surface of hopper 37 as shown in Fig. 8.

It is to be understood that the embodiments shown in the drawing and described in the specification are merely some of the many forms which the invention may take in practice without departing from the scope of the present invention as defined in the appended claims.

I claim:

1. In a temperature telltale including a container, a bead-like object, and a wax-like ingredient for maintaining said object in an upper position in said container when said ingredient is below a predetermined temperature and which permits the object to move therethrough to a lower position in the container when the ingredient is above said predetermined temperature, the improvement comprising:

a funnel in the container;

said funnel having a lower open end located between said upper and lower positions of the object;

said funnel having an upper open end with a peripheral edge in direct contact with the walls of said container around the entire periphery of said upper open end;

and funnel walls tapering inwardly from said upper open end to said lower open end;

said lower open end being only slightly larger than necessary to pass said bead-like object therethrough.

2. The combination with vial, a plurality of shot, and a substance for maintaining said shot in an upper first position in said vial when said substance is below a predetermined temperature and which permits said shot to pass therethrough to a lower second position in the vial when the substance is above a predetermined temperature, of means for impeding return movement of said shot from the second to the first position, said last recited means comprising:

a funnel-like element in said vial;

said funnel-like element having a lower open end located between said upper and lower positions of the shot;

said funnel-like element having an upper open end with a peripheral edge in direct contact with the walls of said container around the entire periphery of said upper open end;

and shot-deflecting walls tapering inwardly from said upper open end to said lower open end;

said lower open end being only slightly larger than necessary to pass the largest of said shot therethrough.

References Cited in the file of this patent

UNITED STATES PATENTS

| | | |
|---|---|---|
| 2,490,933 | Tornquist | Dec. 13, 1949 |
| 2,788,282 | Hammond | Apr. 9, 1957 |
| 2,812,231 | Zar | Nov. 5, 1957 |
| 2,856,930 | Huyck | Oct. 31, 1958 |
| 2,915,405 | Hammond | Dec. 1, 1959 |